United States Patent
Lawrence et al.

(10) Patent No.: US 11,500,337 B2
(45) Date of Patent: Nov. 15, 2022

(54) METHOD AND SYSTEM FOR DIRECTLY TUNING PID PARAMETERS USING A SIMPLIFIED ACTOR-CRITIC APPROACH TO REINFORCEMENT LEARNING

(71) Applicant: Honeywell International Inc., Morris Plains, NJ (US)

(72) Inventors: Nathan Lawrence, North Vancouver (CA); Philip D. Loewen, North Vancouver (CA); Bhushan Gopaluni, Vancouver (CA); Gregory E. Stewart, North Vancouver (CA)

(73) Assignee: Honeywell International Inc., Charlotte, NC (US)

( * ) Notice: Subject to any disclaimer, the term of this patent is extended or adjusted under 35 U.S.C. 154(b) by 116 days.

(21) Appl. No.: 16/673,901

(22) Filed: Nov. 4, 2019

(65) Prior Publication Data
US 2021/0132552 A1 May 6, 2021

(51) Int. Cl.
*G05B 6/02* (2006.01)
*G05B 13/02* (2006.01)

(52) U.S. Cl.
CPC ............. *G05B 6/02* (2013.01); *G05B 13/027* (2013.01)

(58) Field of Classification Search
CPC ................................ G05B 6/02; G05B 13/027
USPC ........................................................ 700/42
See application file for complete search history.

(56) References Cited

U.S. PATENT DOCUMENTS

| | | |
|---|---|---|
| 6,917,925 B2 | 6/2005 | Berenji et al. |
| 8,301,275 B2 | 10/2012 | Tondolo et al. |
| 8,429,096 B1 | 4/2013 | Soundararajan et al. |
| 8,429,097 B1 | 4/2013 | Sivasubramanian et al. |
| 9,349,092 B2 | 5/2016 | Thibeault et al. |
| 9,754,221 B1 | 9/2017 | Nagaraja |
| 9,971,318 B2 | 5/2018 | He et al. |
| 10,152,033 B2 | 12/2018 | LoPiccolo et al. |
| 10,274,977 B2 | 4/2019 | North et al. |
| 10,358,771 B2 | 6/2019 | He et al. |
| 10,429,800 B2 | 10/2019 | Forbes |
| 10,445,641 B2 | 10/2019 | Srinivasan et al. |
| 2017/0024643 A1* | 1/2017 | Lillicrap ............... G06N 3/006 |
| 2019/0042761 A1 | 2/2019 | Wang et al. |
| 2019/0187631 A1 | 6/2019 | Badgwell et al. |
| 2019/0354813 A1* | 11/2019 | Riedmiller ........... G06K 9/6257 |

OTHER PUBLICATIONS

IEEE (Santosh Kumar: A Comparative Study of PID Tuning Methods Using Anti-Windup Controller, 2012, 2nd International Conference on Power, Control and Embedded Systems) (Year: 2012).*

(Continued)

*Primary Examiner* — Jigneshkumar C Patel
(74) *Attorney, Agent, or Firm* — Ortiz & Lopez, PLLC; Luis M. Ortiz; Kermit D. Lopez

(57) ABSTRACT

A method and system for reinforcement learning can include an actor-critic framework comprising an actor and a critic, the actor comprising an actor network and the critic comprising a critic network; and a controller comprising a neural network embedded in the actor-critic framework and which can be tuned according to reinforcement learning based tuning including anti-windup tuning.

20 Claims, 6 Drawing Sheets

(56) References Cited

OTHER PUBLICATIONS

Neural-Network-Based Learning Control for the Highspeed Path Tracking of Unmanned Ground Vehicles (Proceedings of the First International Conference on Machine Learning and Cybernetics, Beijing, Nov. 4-5, 2002), By: Xin Xu (Year: 2002).*

Åström, K. J., & Hägglund, T. (1984). Automatic tuning of simple regulators with specifications on phase and amplitude margins. Automatica, 20(5), 645-651.

Badgwell, T. A., Lee, J. H., & Liu, K. H. (2018). Reinforcement Learning-Overview of Recent Progress and Implications for Process Control. In Computer Aided Chemical Engineering (vol. 44, pp. 71-85). Elsevier.

Berger, M. A., & da Fonseca Neto, J. V. (2013). Neurodynamic Programming Approach for the PID Controller Adaptation. IFAC Proceedings Volumes, 46(11), 534-539.

Berner, J., & Soltesz, K. (Sep. 2017). Short and robust experiments in relay autotuners. In 2017 22nd IEEE International Conference on Emerging Technologies and Factory Automation (ETFA) (pp. 1-8). IEEE.

Bhatnagar, S., Ghavamzadeh, M., Lee, M., & Sutton, R. S. (2008). Incremental natural actor-critic algorithms. In Advances in neural information processing systems (pp. 105-112).

Brujeni, L. A., Lee, J. M., & Shah, S. L. (2010). Dynamic tuning of PII-controllers based on model-free reinforcement learning methods (pp. 453-458). IEEE.

Degris, T., White, M., & Sutton, R. S. (2012). Off-policy actor-critic. arXiv preprint arXiv:1205.4839.

Galeani, S., Tarbouriech, S., Turner, M., & Zaccarian, L. (2009). A tutorial on modern anti-windup design. European Journal of Control, 15(3-4), 418-440.

Hägglund, T., & Åström, K. J. (2002). Revisiting the Ziegler-Nichols tuning rules for PI control. Asian Journal of Control, 4(4), 364-380.

Hast, M., Åström, K. J., Bernhardsson, B., & Boyd, S. (Jul. 2013,). PID design by convex-concave optimization. In 2013 European Control Conference (ECC) (pp. 4460-4465). IEEE.

Kaisare, N. S., Lee, J. M., & Lee, J. H. (2003). Simulation based strategy for nonlinear optimal control: Application to a microbial cell reactor. International Journal of Robust and Nonlinear Control: IFAC-Affiliated Journal, 13(3-4), 347-363.

Lee, J. H., & Lee, J. M. (2006). Approximate dynamic programming based approach to process control and scheduling. Computers & chemical engineering, 30(10-12), 1603-1618.

Lee, J. M., Kaisare, N. S., & Lee, J. H. (2006). Choice of approximator and design of penalty function for an approximate dynamic programming based control approach. Journal of process control, 16(2), 135-156.

Lee, J. M., & Lee, J. H. (2004). Simulation-based learning of cost-to-go for control of nonlinear processes. Korean Journal of Chemical Engineering, 21(2), 338-344.

Lee, J. M., & Lee, J. H. (2005). Approximate dynamic programming-based approaches for input-output data-driven control of nonlinear processes. Automatica, 41(7), 1281-1288.

Lillicrap, T. P., Hunt, J. J., Pritzel, A., Heess, N., Erez, T., Tassa, Y., & Wierstra, D. (2015). Continuous control with jeep reinforcement learning. arXiv preprint arXiv:1509.02971.

Mu, C., Wang, D., & He, H. (2017). Novel iterative neural dynamic programming for data-based approximate optimal control design. Automatica, 81, 240-252.

Saeki, M. (2007). Properties of stabilizing PID gain set in parameter space. IEEE Transactions on Automatic Control, 52(9), 1710-1715.

Sedighizadeh, M., & Rezazadeh, A. (Feb. 2008). Adaptive PID controller based on reinforcement learning for wind turbine control. In Proceedings of world academy of science, engineering and technology (vol. 27, pp. 257-262).

Silver, D., Lever, G., Heess, N., Degris, T., Wierstra, D., & Riedmiller, M. (Jun. 2014). Deterministic policy gradient algorithms.

Skogestad, S. (Nov. 2001). Probably the best simple PID tuning rules in the world. In AIChE Annual Meeting, Reno, Nevada (vol. 77).

Spielberg, S., Tulsyan, A., Lawrence, N. P., Loewen, P. D., & Gopaluni, R. B. (2019). Towards Self-Driving Processes: A Deep Reinforcement Learning Approach to Control. AIChE Journal.

Stewart, G. E. (2012). A pragmatic approach to robust gain scheduling. IFAC Proceedings Volumes, 45(13), 355-362.

Sutton, R. S., & Barto, A. G. (2018). Reinforcement learning: An introduction. "Chapter 1: Introduction", pp. 1-4, MIT Press.

Sutton, R. S., McAllester, D. A., Singh, S. P., & Mansour, Y. (2000). Policy gradient methods for reinforcement learning with function approximation. In Advances in neural information processing systems (pp. 1057-1063).

Ziegler, J. G., & Nichols, N. B. (1942). Optimum settings for automatic controllers, trans. ASME, 64(11).

* cited by examiner

METHOD AND SYSTEM FOR DIRECTLY TUNING PID PARAMETERS USING A SIMPLIFIED ACTOR-CRITIC APPROACH TO REINFORCEMENT LEARNING

TECHNICAL FIELD

Embodiments are generally related to the field of machine learning including Deep Reinforcement Learning (DRL). Embodiments also relate to neural networks and Proportional Integral Derivative (PID) control. Embodiments further relate to the direct tuning of PID parameters using an actor-critic framework.

BACKGROUND

Model-based control methods such as Model Predictive Control (MPC) or Proportional Integral Derivative (PID) control rely on the accuracy of the available plant model. However, gradual changes in the plant result in decreased performance of the controllers. Model reidentification is costly and time-consuming, often making this procedure impractical. As such, controllers will often be tuned for robustness over performance to ensure they are still operational under model uncertainty.

Reinforcement Learning (RL) is a branch of machine learning in which the objective is to learn an optimal policy through interactions with a stochastic environment modeled as a Markov Decision Process (MDP). Only somewhat recently has RL been successfully applied in the process industry. The first successful implementations of RL methods in process control utilized approximate dynamic programming (ADP) methods for optimal control of discrete-time nonlinear systems. While these results illustrate the applicability of RL in controlling discrete-time nonlinear processes, they are also limited to processes for which at least a partial model is available or can be derived through system identification.

Recently, several data-based approaches have been proposed to address the limitations of model-based RL in control. For example, a data-based learning algorithm has been proposed to derive an improved control policy for discrete-time nonlinear systems using ADP with an identified process model. Another proposal involves a Q-learning algorithm to learn an improved control policy in a model-free manner using only input-output data. While these methods remove the requirement for having an exact model, they still present several issues. For example, proposed solutions are still based on ADP, so its performance relies on the accuracy of the identified model. Note that as utilized herein, the term "model-free" relates to the plant, meaning the disclosed algorithm does not assume any information or structure about the plant. There are two types of models: models of the plant, and models (e.g., neural networks) in the machine learning algorithm (that have nothing to do with control or the plant). The term "model-free" as utilized herein can relate to not using a model for the plant.

Other approaches to RL-based control include using a fixed control strategy such as PID. With applications to process control, some solutions have developed a model-free algorithm to dynamically assign the PID gains from a pre-defined collection derived from Internal Model Control. Other approaches, on the other hand, may involve dynamically tuning a PID controller in a continuous parameter space using the actor-critic method, where the actor is the PID controller. This approach is based on Dual Heuristic Dynamic Programming, where an identified model may be assumed to be available. The actor-critic method has also been employed in applications where the PID gains are the actions taken by the actor at each time-step.

These methods treat the PID gains as the action by a RL agent by some function approximation method such as Deep Neural Network or Quadratic Function Approximation. This point of view can lead to dynamically changing PID gains. While closed-loop instability has not been in the aforementioned approaches, it is known in the hybrid system literature that switching between control strategies, even stabilizing ones, can destabilize the closed-loop system.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an improved machine learning method and system.

It is another aspect of the disclosed embodiments to provide for a method and system, which allows for the direct tuning of PID parameters using an actor-critic framework.

The aforementioned aspects and other objectives can now be achieved as described herein. In an embodiment, a system for reinforcement learning can include an actor-critic framework comprising an actor and a critic, the actor comprising an actor network and the critic comprising a critic network; and a controller comprising a neural network embedded in the actor-critic framework and which can be tuned according to reinforcement learning based tuning including anti-windup tuning.

In an embodiment, the controller can include parameters comprising an anti-windup parameter.

In an embodiment, the controller can allow for constraining of individual parameters.

In an embodiment, the actor network can be initialized with gains, which are already in use or known to be stabilizing.

In an embodiment, the controller can include a PID (Proportional Integral Derivative) controller.

In an embodiment, the weights associated with the actor can be initialized with selected PID gains.

In an embodiment, the PID controller can include a (Proportional-Derivative) portion and an integral portion.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
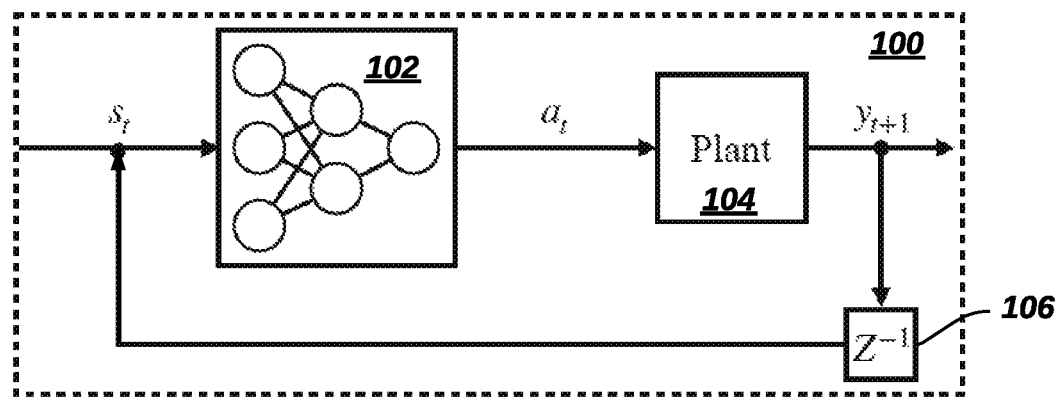
FIG. 1 illustrates a block diagram of a closed-loop system based on a plant model that includes a neural network and a plant, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Note that as utilized herein the term plant can relate to a "plant" in the context of control theory. A plant in this context can be the combination of process and an actuator and may also be considered as a transfer function indicating the relationship between an input signal and the output signal of a system without feedback, commonly determined by physical properties of the system. An example may be an actuator with its transfer of the input of the actuator to its physical displacement. In a system with feedback, the plant still may have the same transfer function, but a control unit and a feedback loop (with their respective transfer functions) may be added to the system.

FIG. 1 illustrates a block diagram of a closed-loop system 100 based on a plant model that includes a neural network 102 and a plant 104, in accordance with an embodiment. The closed-loop system 100 can be implemented based on Deep Reinforcement Learning and an actor-critic architecture to develop a model-free, input-output controller for set-point tracking problems of discrete-time nonlinear processes. An ReLU Deep Neural Network (DNN) can parameterize both the actor and critic in such an actor-critic architecture. At the end of the training, the closed loop system 100 can include the plant 104 together with the neural network 102 as a feedback controller. Note that the neural network 102 may be implemented as a DNN. Thus, in FIG. 1, the neural network 102 can be thought of as a "block-box" in the sense that even with an exact plant model, it is unclear whether the closed-loop system is internally stable.

The disclosed embodiments thus relate to a simple interpretation of the actor-critic framework by expressing a PID controller as a shallow neural network. The PID gains can be the weights of the actor network. The critic is the Q-function associated with the actor, and can be parameterized by a DNN. The disclosed embodiments can apply a Deep Deterministic Policy Gradient algorithm and can include a significant simplification of a model-free approach to control. The disclosed embodiments can be extended to include a tuning parameter for Anti-Windup compensation. Finally, the simplicity of the disclosed actor network allows us to use initialize training with pre-existing PID gains as well as incorporate individual constraints on each parameter. The actor can be therefore initialized as an operational, interpretable, and industrially accepted controller that can be then updated in an optimal direction after each roll-out in the plant.

Figure 2:
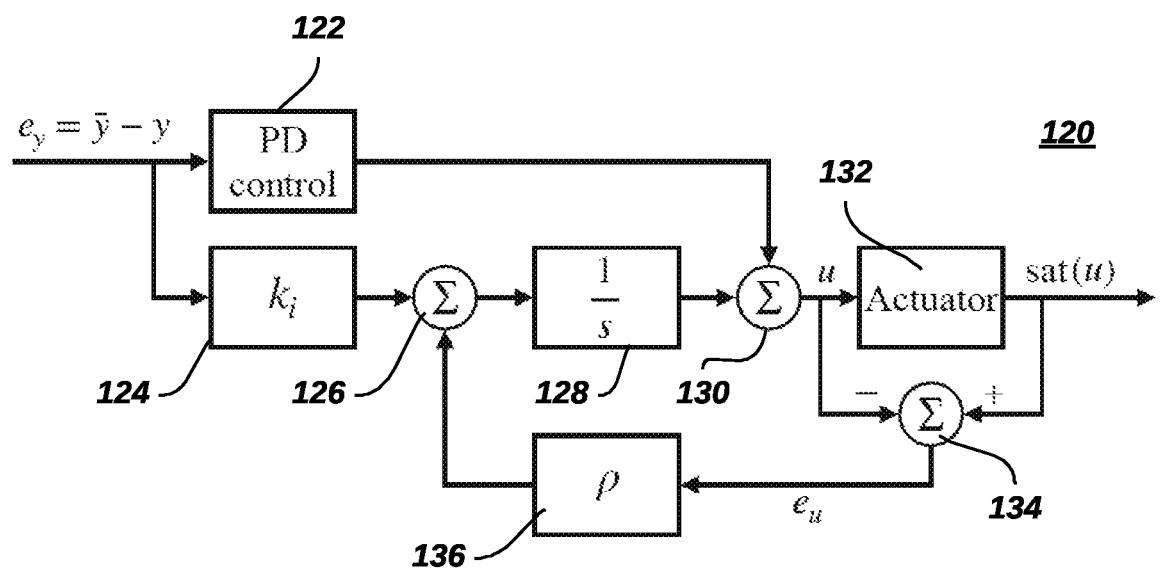
FIG. 2 illustrates a block diagram of a closed-loop system that includes a PID controller and an actuator, in accordance with an embodiment.

FIG. 2 illustrates a block diagram of a closed-loop system 120 that includes a PID controller comprising a PD control block 122, a $k_i$ block 124, and an actuator 132, in accordance with an embodiment. In the closed-loop system 120 shown in FIG. 2, the PID controller, including the PD control block 122 and the $k_i$ block 124, can be subject to an input $e_y = \bar{y} - y$. That is, the input $e_y = \bar{y} - y$ can be input to both the PD control block 122 and the $k_i$ block 124. The PD control block 122 PID 122 supplies an output signal that can be fed as input to a summation unit 130.

The PID controller is thus split into two pieces: a PD (proportional-derivative) portion and an I (Integral) portion.

The PD control block 122 leading to a summation block 130 concerns the first split, PD. The $k_i$ block 124 provides an output signal that can be supplied as input to a summation unit 126. The output signal from the summation unit 126 can be fed as input to a 1/s block 128, which in turn can provide a signal that is fed to, and completing, the summation block 130. The output signal from the summation block 130 can be the signal fed to the actuator 132. The output of the actuator 132 can be the saturated output signal from the summation block 130. The difference between the output signal from the summation block 130 and the actuator 132 can be evaluated at the summation block 134. The output from summation block 134 is fed to the block 136, the output of which can be then fed to, and completes the summation block 126.

A parallel form of a PID controller can be implemented as shown in Equation (1):

$$u(t) = k_p e(t) + k_i \int_0^t e(\tau)d\tau + k_d \frac{d}{dt}e(t). \qquad (1)$$

In Equation (1) above, we can refer to a reference signal at time t as $\bar{y}(t)$, then $e_y(t):=\bar{y}(t)-y(t)$. To implement the PID controller it may be necessary to discretize the parameter u in Equation (1). In such a case, we can let $\Delta t>0$ be a fixed sampling time and then define $I_y(t_n)=\Sigma_{i=1}^n e_y(t_i)\Delta t$, where $0=t_0<t_1< \ldots <t_n$, and $$D(t_n) = \frac{e(t_n) - e(t_{n-1})}{\Delta t}.$$

The parameter u can be then used to refer to the discretized version of Equation (1), which can be written as follows as shown in Equation (2):

$$u(t_n):=k_p e(t_n)+k_i I_y(t_n)+k_d D(t_n). \qquad (2)$$

The problem of tuning a PID controller can be handled utilizing a variety of approaches. For example, strategies can range from heuristics with look-up tables, optimization methods, relay tuning or some combination of one or more of these strategies.

The PID controller can become saturated when it has output constraints and can be given a setpoint outside of the operating region. If the actuator constraints are two scalars $\alpha<\beta$, the saturation function can be defined as shown in Equation (3) below:

$$sat(u) = \begin{cases} u, & \text{if } \alpha \leq u \leq \beta \\ \alpha, & \text{if } u < \alpha \\ \beta, & \text{if } u > \beta \end{cases}. \qquad (3)$$

If saturation persists, the controller can operate in an open-loop and the integrator can continue to accumulate error at a non-diminishing rate; that is, the integrator can experience windup. This can create a nonlinearity in the PID controller and may destabilize the closed-loop system 100. Methods for mitigating the effects of windup can be referred to by the term anti-windup.

While there are many approaches to anti-windup design, the disclosed approach focuses on back-calculation, which can function in discrete-time by feeding into the control signal, a scaled sum of past deviations of the actuator signal from the unsaturated signal. The nonnegative scaling constant, $\beta$, can govern how quickly the PID controller unsaturates (that is, returns to the region $[\alpha, \beta]$). Precisely, we can define $e_u(t):=sat(u(t))-u(t)$ and $I_u(t_n):=\Sigma_{i=1}^{n-1} e_u(t_i)\Delta t$, then we redefine the PID controller from Equation (2) to the following, as shown in Equation (4):

$$u(t_n):=k_p e(t_n)+k_i I_y(t_n)+k_d D(t_n)+\rho I_u(t_n) \qquad (4)$$

From Equation (3) it is clear that if the PID controller is operating within its constraints, then Equation (4) can be equal to Equation (2); otherwise the differences sat(u)−u can add negative feedback to the PID controller if $u>\beta$, or positive feedback if $u<\alpha$. Further, Equation (4) can equal to Equation (3) when $\rho=0$; therefore the recovery time of the PID controller to the operating region $[\alpha, \beta]$ may be slower the closer it is to zero and more aggressive when $\rho$ is large.

As previously described, the actor (PID controller) can be updated after each roll-out with the environment. We are, however, free to change the PID gains at each timestep, as is originally formulated and implemented. There are two main reasons for avoiding this. One is that the PID controller can be designed for set-point tracking and may be an inherently intelligent controller that simply needs to be improved subject to the user-defined objective (e.g., reward function). Second, when the PID gains are free to change at each time-step, the learned policy can essentially function as a gain scheduler. The closed loop stability therefore can become more difficult to analyze, even if all the gains are stabilizing.

We now turn to the subject of PID in the reinforcement-learning framework. The disclosed PID tuning can stem from a state-space representation of Equation (2), as shown below in Equation (5) and Equation (6):

$$\begin{bmatrix} e_y(t_{n+1}) \\ I_y(t_{n+1}) \\ D(t_{n+1}) \\ I_u(t_{n+1}) \end{bmatrix} = \begin{bmatrix} 0 & 0 & 0 & 0 \\ 0 & 1 & 0 & 0 \\ -1/\Delta t & 0 & 0 & 0 \\ 0 & 0 & 0 & 1 \end{bmatrix}\begin{bmatrix} e_y(t_n) \\ I_y(t_n) \\ D(t_n) \\ I_u(t_n) \end{bmatrix} + \begin{bmatrix} 1 & 0 \\ \Delta t & 0 \\ 1/\Delta t & 0 \\ 0 & \Delta t \end{bmatrix}\begin{bmatrix} e_y(t_{n+1}) \\ e_u(t_{n+1}) \end{bmatrix} \qquad (5)$$

$$\hat{u}(t_{n+1}) = [k_p \quad k_i \quad k_d \quad \rho]\begin{bmatrix} e_y(t_{n+1}) \\ I_y(t_{n+1}) \\ D(t_{n+1}) \\ I_u(t_{n+1}) \end{bmatrix} \qquad (6)$$

$$u(t_{n+a}) = sat(u(t_{n+1})) \qquad (7)$$

Equation (5) simply describes the computations that may be necessary for implementing a PID controller with a fixed sampling time. On the other hand, Equation (6) parameterizes the PID controller. We therefore can take Equation (6) and Equation (7) above to be a shallow Neural Network, where $[k_p, k_i, k_d, \rho]$ is a vector of trainable weights and the saturation function of Equation (7) is a nonlinear activation. In the next section we explain how Reinforcement Learning (RL) can be used to train these weights without a process model.

The fundamental components of RL are the policy, the objective, and the environment. We can assume that a Markov Decision Process with action space U and state space S may model the environment. Here, $s_t \in A$ can refer to the left-hand side of Equation (5) and $u_t \in U$ can refer to the left-hand side of Equation (6). The vector of weights parameterizing Equation (6) can be referred to as K. Formally, the PID controller with anti-windup compensation in Equation (6) can be given by the mapping $\mu(.,K):S \to U$ such that $u_t = \mu(s_t, K)$.

The controller can interact with the environment, and can be therefore modeled as an initial distribution $p(s_1)$ with a transition distribution $(p_{s+1}|s_t, u_t)$. These interactions are goal-oriented. That is, each interaction with the environment can be scored with a scalar value called the reward. A goal of RL can be to find a controller that can maximize the expectation of future rewards across state-action pairs.

We can define the state $s_t$ as in Equation (6) and the reward function to be as shown in Equation (8) below:

$$r(s_t, u_t) = -(|e_y(t)|^p + \lambda |u_t|), \quad (8)$$

where p=1 or 2 and $\lambda \geq 0$ are fixed during training. We can use the notation $h \sim p^\mu(\cdot)$ to denote an arbitrary trajectory $h = (s_1, u_1, r_1, \ldots, s_T, u_T, r_T)$ generated by the policy $\mu$, where T is a random variable referred to as the terminal time and $r_t$ is shorthand for the reward at time t.

The desirability of a PID controller with gains K can be measured in terms of the expected cumulative reward over trajectories h:

$$J(\mu(\cdot, K)) = \mathbb{E}_{h \sim p^\mu(\cdot)} \left[ \sum_{t=1}^{\infty} \gamma^{t-1} r(s_t, \mu(s_t, K)) \Big| s_0 \right] \quad (9)$$

where $s_0 \in S$ is a starting state, and $0 \leq \gamma \leq 1$ is a discount factor. Our strategy is to iteratively maximize J via stochastic gradient ascent, as maximizing J corresponds to finding the optimal PID gains. This objective may require several additional concepts, which are outlined in the next section.

Equation (9) above can be referred to as the value function for policy $\mu$. Closely related to the value function is the Q-function, which can consider state-action pairs in the conditional expectation:

$$Q(s_t, u_t) := \mathbb{E}_{h \sim p^\mu(\cdot)} \left[ \sum_{t=1}^{\infty} \gamma^{t-1} r(s_t, \mu(s_t, K)) \Big| s_t, u_t \right] \quad (10)$$

In continuous state and action spaces, we may not be able to precisely evaluate Equation (10). Instead, we can approximate Q iteratively using a deep neural network with training data from Replay Memory. Replay Memory can be a fixed-size collection of tuples of the form $(s_t, u_t, s_{t+1}, r_t)$. Concretely, we can write a parametrized Q-function, $Q(\cdot, \cdot, W_c)$: $S \times U \to \mathbb{R}$, where $W_c$ is a collection of weights. This approximate Q-function can be referred to as the critic. One of our objectives can therefore be to minimize the loss:

$$\mathcal{L}_t(W_c) = \mathbb{E}_{s_t \sim \rho^\beta(\cdot), u_t \sim \beta(\cdot|s_t)} [q_t - Q(s|_t, u_t, W_c))^2],$$

where $q_t$ refers to a target for the value $Q(s_t, u_t, W_c)$). Ideally, $q_t = Q^*(s_t, u_t)$, but since $Q^*$ may be unavailable, we can use the bootstrap approximation as follows:

$$Q(s_t, u_t) = \mathbb{E}_{s_{t+1} \sim p(\cdot|s_t, u_t)} [r(s_t, u_t) + \gamma Q(s_{t+1}, u_{t+1})] \approx \quad (11)$$

$$r(s_t, u_t) + \gamma Q(s_{t+1}, \mu(s_{t+1}, K), W_c) = q_t.$$

The quantity given by Equation (11) above can be tractable since each term can be held in Replay Memory or computed with $\mu$ or the DNN approximation of Q.

Figure 3:
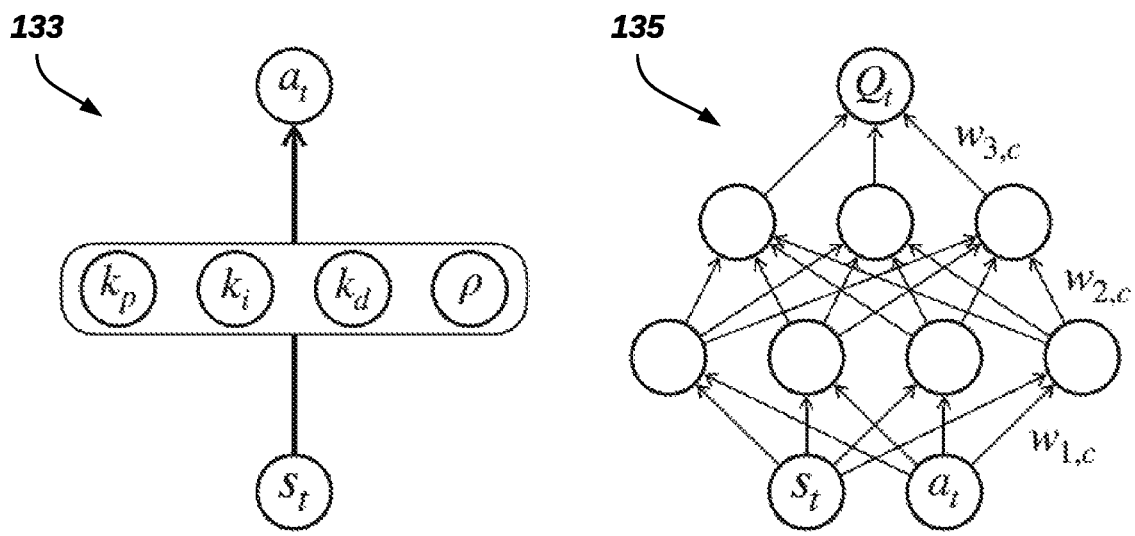
FIG. 3 illustrates a block diagram of a parameterized form of an actor and a critic in the context of an actor-framework framework, in accordance with an embodiment.

FIG. 3 illustrates a block diagram of an actor 133 and a critic 135 in an actor-critic framework, in accordance with an embodiment. The actor 133 is shown at the left side of FIG. 3 and depicts the input passing through PID parameters, leading to an action. On the right side of FIG. 3 is the critic 135, which is a DNN (Deep Neural Network), which takes as inputs, the input-output from the actor 133.

The deterministic actor-critic method can be the basis of the DRL controller. More precisely, the actor-critic method can be a combination of policy gradient methods and Q-learning via a temporal difference (TD) update. The actor can be the PID controller given by Equation (7) and the critic can be an approximation of the Q-function given in Equation (11).

Returning to our objective of maximizing Equation (9), we can employ a stochastic gradient method on both the actor and critic. To perform this update, we can use a policy gradient theorem for deterministic policies to approximate the gradient of J in terms of the critic $Q^\mu(\cdot, \cdot, W_c)$, as follows:

$$\hat{\nabla}_K J(\mu(\cdot, K)) = \hat{\mathbb{E}}_{s_t \sim \rho_\gamma^\beta(\cdot)} [\nabla_u Q^\mu(s_t, u, W_c)|_{u = \mu(s_t, K)} \nabla_K \mu(s_t, K)], \quad (12)$$

where $\rho_\gamma^\beta(s) = \sum_{n=0}^{\infty} \gamma^t p(s_t = s | s_0, \mu)$ is a discounted state visitation distribution. Note that Equation (9) is maximized only when the policy parameters K are optimal, which can then lead to the following update scheme:

$$W_{t+1} \leftarrow W_t + \alpha_{c,t} \hat{\nabla}_K J(\mu(\cdot, K))|_{K=W_t}. \quad (13)$$

We can update the parameters in Equation (11) for the critic using batch gradient descent, where our batch data come from a cache of tuples of the form $(S_t, u_t, S_{t+1}, r(S_t, S_{t+1}, u_t))$. Hence, it is important that our state properly captures the dynamics of the system it represents, so as to make meaningful parameter updates.

Since the actor network may be simply a PID controller, we are able to incorporate known information about the plant it is controlling. For instance, we are able to initialize the actor network with gains that are already in use or known to be stabilizing. The idea is that these gains will be updated by stochastic gradient ascent in the approximate direction leading the greatest expected reward.

If a rough model of the process is known, we can estimate the region of PID gains in $\mathbb{R}^3$ for which closed-loop stability is attained. One method for achieving this is can involve considering the boundary of the stabilizing gains set that includes the pairs $(k_p, k_i)$, $(k_p, k_d)$, or $(k_i, k_d)$.

One advantage of the disclosed approach is that the weights for the actor can be initialized with hand-picked PID gains. For example, if a plant such as the plant 104 shown in FIG. 1 is operating with known gains $k_p$, $k_i$, and $k_d$, then these gains can be used to initialize the actor. The quality of the gain can update and then rely on the quality of the value function used in Equation (13). The value function can be parameterized by a deep neural network and can be therefore initialized randomly. Both the actor and critic parameters can be updated after each roll-out with the environment. However, depending on the number of timesteps in each roll-out, this can lead to slow learning. Therefore, we can continually update the critic during the roll-out using batch data from Replay Memory.

Equation (14) and the Algorithm 1 shown below present an example of a DRL algorithm:

$$\frac{\partial Q^\mu}{\partial u}(s, u, w) := \quad (14)$$

$$\frac{\partial Q^\mu}{\partial u}(s, u, w) \times \frac{\partial Q^\mu}{\partial u}(s, u, w) \times \begin{cases} \dfrac{u_H - u}{u_H - u_L}, & \text{if } \dfrac{\partial Q^\mu}{\partial u}(s, u, w) > 0 \\ \dfrac{u - u_L}{u_H - u_L}, & \text{otherwise} \end{cases}$$

That is, as shown below, Algorithm 1 is an example of a deep reinforcement learning (DRL) controller.

---

Algorithm 1 Deep Reinforcement Learning Controller

---

1: Output: Optimal PID controller μ(s, K)
2: Initialize: Actor K to tuning parameters
3: Initialize: Critic $W_c$ to random weights
4: Initialize: Target weights $K_\alpha' \leftarrow K$ and $W_c' \leftarrow W_c$
5: Initialize: Replay memory (RM) with random policies
6: for each episode do
7:   Initialize: e(0), I(0), D(0)
8:   Set $y_{sp} \leftarrow$ set-point from the user
9:   for each step t of episode 0, 1, . . . T − 1 do
10:    Set s ← $\langle e_t, I_t, D_t \rangle$
11:    Set $u_t \leftarrow \mu(s, K) + \mathcal{N}$
12:    Take action $u_t$, observe $y_{t+1}$ and r
13:    Set s' ← $\langle e_{t+1}, I_{t+1}, D_{t+1} \rangle$
14:    Store tuple (s, $u_t$, s', r) in RM
15:    Uniformly sample M tuples from RM
16:    for i = 1 to M do
17:       Set $\hat{y}^{(i)} \leftarrow r^{(i)} + \gamma Q^\mu(s'^{(i)}, \mu(s'^{(i)}, K_\alpha'), W_c')$ 18:
$$\text{Set } W_c \leftarrow W_c + \frac{\alpha_c}{M} \sum_{i=1}^{M} (\hat{y}^{(i)} - Q^\mu(s^{(i)}, u^{(i)}, W_c)) \nabla_{W_c} Q^\mu(s^{(i)}, u^{(i)}, W_c)$$

19:    for i = 1 to M do
20:       Calculate $\nabla_u Q^\mu(s^{(i)}, u, W_c)|_{u=u^{(i)}}$
21:       Clip $\nabla_u Q^\mu(s^{(i)}, u, W_c)|_{u=u^{(i)}}$ using (14)

22:    Set $K \leftarrow K +$
$$\left. \frac{\alpha_c}{M} \sum_{i=1}^{M} \nabla_K \mu(s^{(i)}, K) \nabla_u Q^\mu(s^{(i)}, u, W_c) \right|_{u=u^{(t)}}$$

23:    Set $K_\alpha' \leftarrow \tau K + (1 - \tau) K_\alpha'$
24:    Set $W_c' \leftarrow \tau W_c + (1 - \tau) W_c'$

---

In the following non-limiting examples, the RMSprop optimizer was used to train the actor and SGD with momentum to train the critic. The actor and critic networks were trained using TensorFlow and the processes were simulated in discrete time with the Control Systems Library for python. The hyper parameters in Algorithm 1 used across all examples are as follows: Mini-batch size M=256, Replay Memory size is $10^{-5}$, and discount factor γ=0.99.

In a first example, we can consider the following continuous-time transfer function:

$$G(s) = \frac{2e^{-s}}{6s+1}. \quad (15)$$

In this example, we consider a PI controller initialized with gains $k_p$=0.2; $k_i$=0.05. We can discretize Equation (15) with timesteps of 0.1 seconds.

A second example concerns the double integrator, $G(s) = 1/s^2$. Consider the following collection of transfer functions:

$$P = \{G(s)e^{-\tau s}: 0 \leq \tau \leq 0.1\} \quad (16)$$

In a third example, we can incorporate an anti-windup tuning parameter. Consider the following transfer function, as shown in Equation (17):

$$G(s) = \frac{1}{(s+1)^3}. \quad (17)$$

Figure 4:
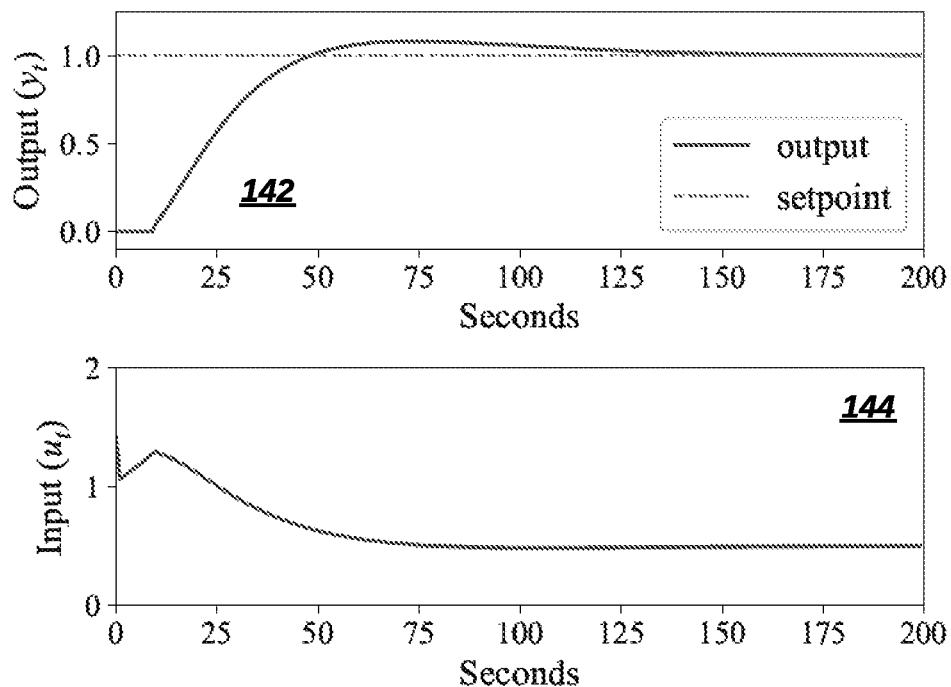
FIG. 4 illustrates graphs depicting simulation results based on the training of actor and critic networks, in accordance with an embodiment.

FIG. 4 illustrates graphs 142, 144, pertaining to example 1 (equation 15), depicting simulation results based on the training of an actor and critic networks, in accordance with an embodiment. Graph 142 plots data indicative of output data versus time (seconds). Graph 144 plots data indicative of input data versus time (seconds).

Figure 5:
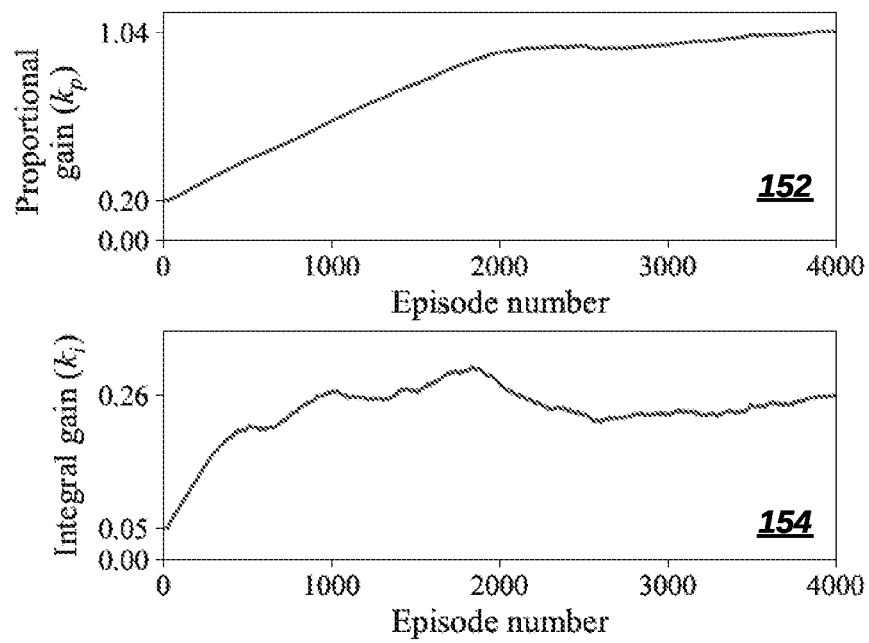
FIG. 5 illustrates graphs depicting simulation results based on the training of actor and critic networks, in accordance with an embodiment.

FIG. 5 illustrates graphs 152, 154, pertaining to example 1 (equation 15), depicting simulation results based on the training of actor and critic networks, in accordance with an embodiment. Graph 152 plots data indicative of proportional gain with respect to episode number. Graph 154 plots data indicative of integral gain with respect to episode number.

Figure 6:
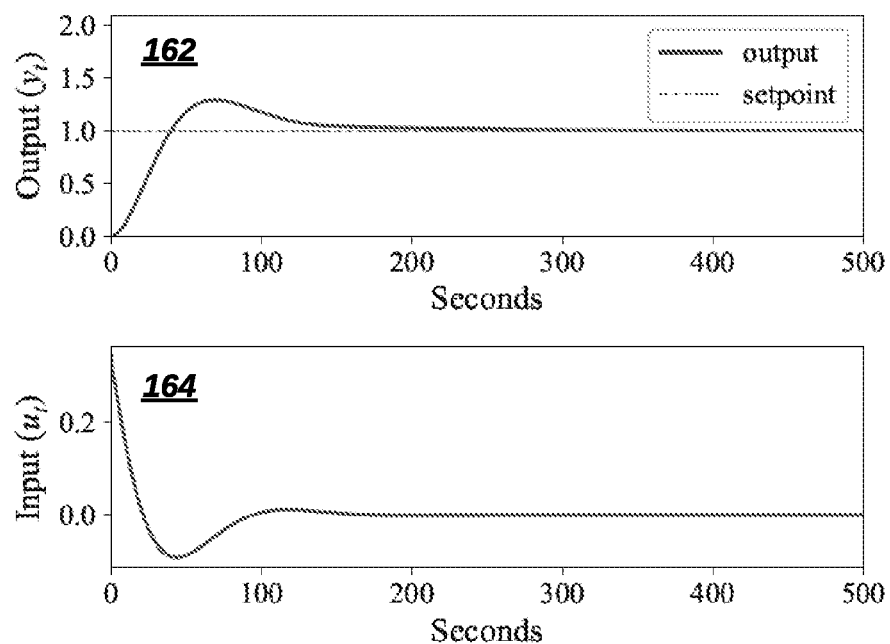
FIG. 6 illustrates graphs depicting simulation results based on the training of actor and critic networks, in accordance with an embodiment.

FIG. 6 illustrates graphs 162, 164, pertaining to example 2 (equation 16), depicting simulation results based on the training of actor and critic networks, in accordance with an embodiment. Graph 162 plots data indicative of output data versus time (seconds), and graph 164 plots data indicative of input data versus time (seconds).

Figure 7:
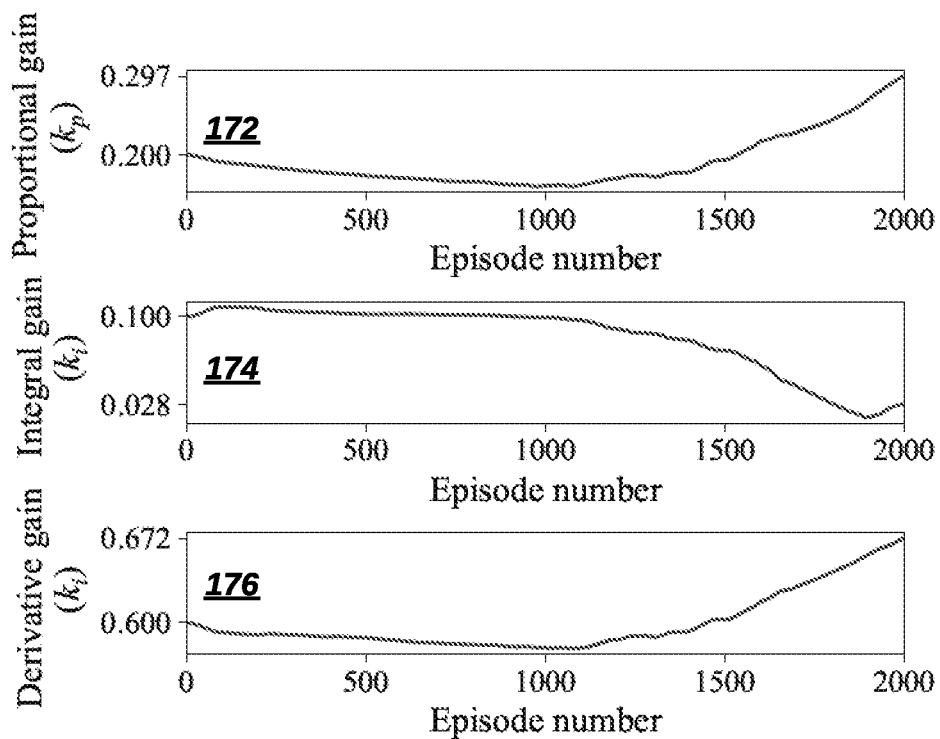
FIG. 7 illustrates graphs depicting simulation results based on the training of actor and critic networks, in accordance with an embodiment.

FIG. 7 illustrates graphs 172, 174, 176, pertaining to example 2 (equation 16), depicting simulation results based on the training of actor and critic networks, in accordance with an embodiment. Graph 172 plots data indicative of proportional gain with respect to episode numbers. Graph 174 plots data indicative of integral gain with respect to episode numbers. Graph 176 plots data indicative of derivative gain with respect to episode numbers.

Figure 8:
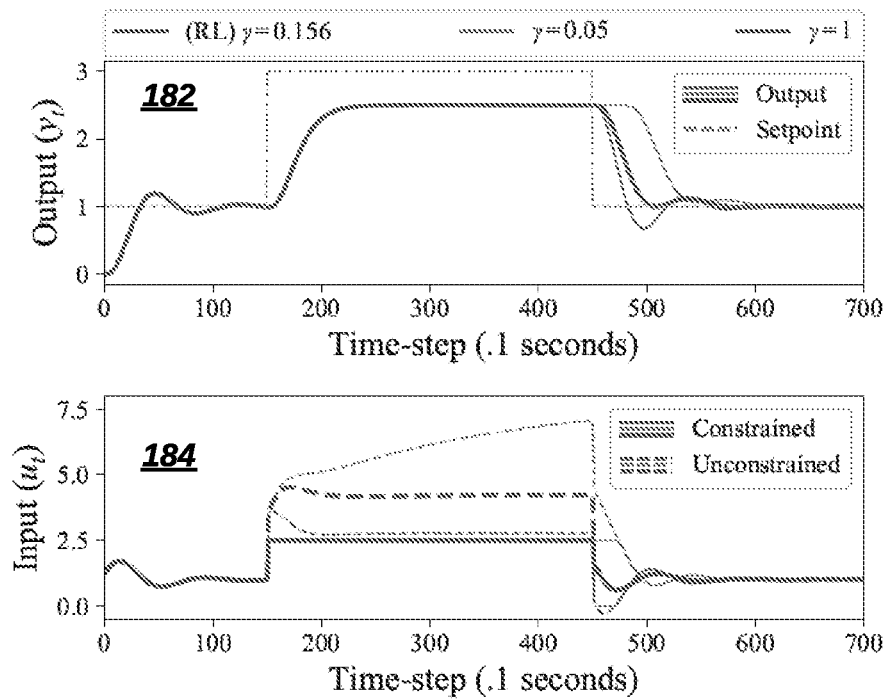
FIG. 8 illustrates graphs depicting simulation results based on the training of actor and critic networks, in accordance with an embodiment.

FIG. 8 illustrates graphs 182, 184, pertaining to example 3 (equation 17), depicting simulation results based on the training of actor and critic networks, in accordance with an embodiment. Graph 182 plots data indicative of output versus time-steps. Graph 184 plots data indicative of input versus time-steps.

Figure 9:
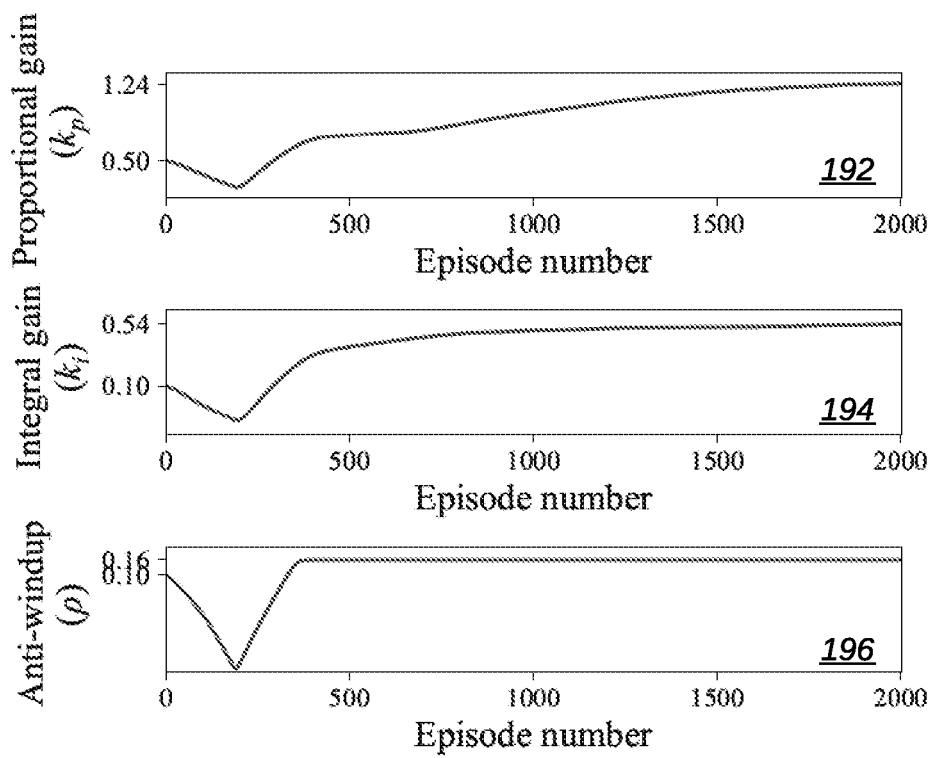
FIG. 9 illustrates graphs depicting simulation results based on the training actor and critic networks, in accordance with an embodiment.

FIG. 9 illustrates graphs 192, 194, 196, pertaining to example 3 (equation 17), depicting simulation results based on the training of actor and critic networks, in accordance with an embodiment. Graph 192 plots data indicative proportional gain with respect to episode numbers. Graph 194 plots data indicative of integral gain with respect to episode numbers. Graph 106 plots data indicative of anti-windup with respect to episode numbers.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a bidirectional data communications network such as a local area network (LAN) or a wide area network (WAN), a wireless local area network (WLAN), wireless data network e.g., Wi-Fi, Wimax, 802.xx, and/or a cellular network or the bidirectional connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block or feature of the illustrations, and combinations of blocks or features, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks or elsewhere herein. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
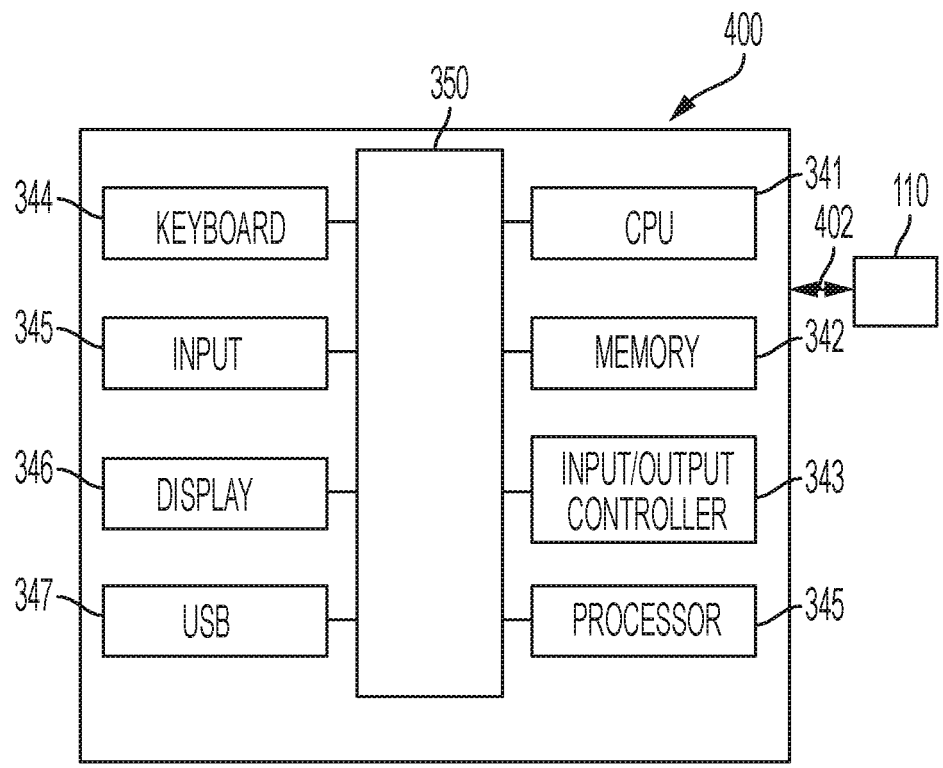
FIG. 10 illustrates a schematic view of a data-processing system, in accordance with an embodiment.
Figure 11:
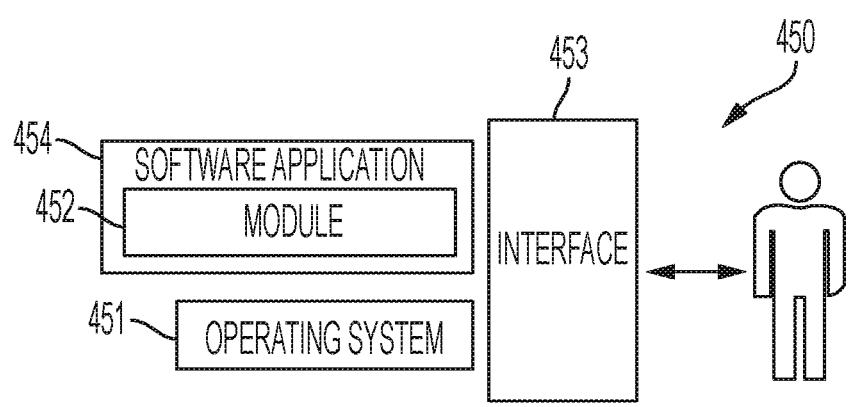
FIG. 11 illustrates a schematic view of a software system including a module, an operating system, and a user interface, in accordance with an embodiment.

FIGS. 10-11 are shown only as exemplary diagrams of data-processing environments in which example embodiments may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, some embodiments may be implemented in the context of a data-processing system 400 that can include, for example, one or more processors such as a CPU (Central Processing Unit) 341 and/or other another processor 349 (e.g., microprocessor, microcontroller etc), a memory 342, an input/output controller 343, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a smartphone, a tablet computing device, a networked computer server, and so on, wherein each such device can be operably connected to and/or in communication with a client-server based network or other types of networks (e.g., cellular networks, Wi-Fi, etc). The data-processing system 400 can communicate with other devices such as, for example, an electronic device 110. Communication between the data-processing system 400 and the electronic device 110 can be bidirectional, as indicated by the double arrow 402. Such bidirectional communications may be facilitated by, for example, a computer network, including wireless bidirectional data communications networks.

FIG. 11 illustrates a computer software system 450 for directing the operation of the data-processing system 400 depicted in FIG. 10. Software application 454, stored for example in the memory 342 can include one or more modules such as module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions, steps or operations such as those discussed herein. Module 452 may also be composed of a group of modules and/or sub-modules.

The following discussion is intended to provide a brief, general description of suitable computing environments in which the system and method may be implemented. The disclosed embodiments can be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that can perform particular tasks or which can implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be private (e.g., accessible only to that module) and which can include source code that actually implements the routines in the module. The term module can also relate to an application, such as a computer program designed to assist in the performance of a specific task, such as implementing the operations associated with the example Algorithm 1 previously discussed herein.

It can be appreciated that the technical solutions described herein are rooted in computer technology, particularly using reinforcement learning frameworks. The technical solutions described herein can improve such computer technology by providing the one or more advantages described throughout the present disclosure by improving the performance of an incremental control system and devices such as a controller (e.g., a PID controller). The tuning of a PID controller is a challenge across many industries. There are often many more PID controllers in a mill or plant than there are competent persons to tune them. Therefore, having an automated loop-tuning method could improve process control and thus improve throughput, yield, or quality, while saving time and effort.

The disclosed embodiments can utilize a machine learning approach referred to as reinforcement learning to experiment on a process and find optimal PID tuning parameters. The disclosed embodiments include (a) the inclusion of a fourth PID tuning parameter—the anti-windup parameter in the tuning algorithm, (b) direct use of the PID controller itself as the 'actor' within the reinforcement learning approach, and (c) episodic switching of PID parameters where the PID parameters are not updated at every controller update, but instead can be set for a longer period of time to gather more data about the system performance with the improved parameters.

Note that the term machine learning as utilized herein can related to methods, systems and devices for data analysis, which can automate analytical model building. Machine learning is a branch of artificial intelligence based on the concept that systems can learn from data, identify patterns and make decisions with minimal human intervention. The use of machine learning can lead to technical solutions that improve the underling computer technology, such as increased efficiencies in computer memory management, data-processing an energy savings.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for reinforcement learning, the system comprising:
an actor-critic framework comprising an actor and a critic, the actor comprising an actor network including a proportional integral derivative (PID) controller having PID gains, wherein the PID gains are weights of the actor network, the weights of the actor network initialize the PID gains on each parameter of the PID controller, and the critic comprises a critic network including at least one function associated with the actor, wherein the PID controller comprises parameters including an anti-windup parameter associated with tuning of the PID controller, wherein the anti-windup parameter functions in discrete-time by feeding into a control signal using a scaled sum of past deviations of an actuator signal from an unsaturated signal with a nonnegative scaling constant, to redefine the PID controller; and
a controller including the PID controller comprising a neural network embedded in the actor-critic framework and which is tuned according to reinforcement learning based tuning including anti-windup tuning.

2. The system of claim 1 wherein the controller allows for constraining of individual parameters.

3. The system of claim 1 wherein the actor network is initialized with gains, which are already in use or known to be stabilizing.

4. The system of claim 1 wherein the weights associated with the actor are initialized with selected PID gains.

5. The system of claim 1 wherein the PID controller comprises a (Proportional-Derivative) portion.

6. The system of claim 1 wherein the PID controller comprises an integral portion.

7. The system of claim 1 wherein the PID controller comprises a PD (Proportional-Derivative) portion and an integral portion.

8. A system for reinforcement learning, the system comprising:
at least one processor; and
a non-transitory computer-usable medium embodying computer program code, said non-transitory computer-usable medium capable of communicating with said at least one processor, said computer program code comprising instructions executable by said at least one processor and configured for:
providing an actor-critic framework comprising an actor and a critic, the actor comprising an actor network including a proportional integral derivative (PID) controller having PID gains, wherein the PID gains are weights of the actor network, the weights of the actor network initialize the PID gains on each parameter of the PID controller, and the critic comprises a critic network including at least one function associated with the actor, wherein the PID controller comprises parameters including an anti-windup parameter associated with tuning of the PID controller, wherein the anti-windup parameter functions in discrete-time by feeding into a control signal using a scaled sum of past deviations of an actuator signal from an unsaturated signal with a nonnegative scaling constant, to redefine the PID controller; and tuning a controller including the PID controller comprising a neural network embedded in the actor-critic framework, wherein the tuning of the controller comprises reinforcement learning based tuning including anti-windup tuning.

9. The system of claim 8 wherein the controller allows for constraining of individual parameters.

10. The system of claim 8 wherein the instructions are further configured for initializing the actor network with gains, which are already in use or known to be stabilizing.

11. The system of claim 8 wherein the instructions are further configured for initializing the weights associated with the actor with selected PID gains.

12. A method for reinforcement learning, the method comprising:

providing an actor-critic framework comprising an actor and a critic, the actor comprising an actor network including a proportional integral derivative (PID) controller having PID gains, wherein the PID gains are weights of the actor network, the weights of the actor network initialize the PID gains on each parameter of the PID controller, and the critic comprises a critic network including at least one function associated with the actor, and wherein the PID controller comprises parameters including an anti-windup parameter associated with tuning of the PID controller, wherein the anti-windup parameter functions in discrete-time by feeding into a control signal using a scaled sum of past deviations of an actuator signal from an unsaturated signal with a nonnegative scaling constant, to redefine the PID controller; and tuning a controller comprising a neural network embedded in the actor-critic framework, wherein the tuning of the controller comprises reinforcement learning based tuning including anti-windup tuning.

13. The method of claim 12 wherein the controller allows for constraining of individual parameters.

14. The method of claim 12 further comprising initializing the actor network with gains that are already in use or known to be stabilizing.

15. The method of claim 12 further comprising initializing the weights associated with the actor with selected PID gains.

16. The method of claim 12 further comprising:

initializing the actor network with gains that are already in use or known to be stabilizing; and initializing the weights associated with the actor with selected PID gains.

17. The method of claim 16 wherein the PID controller comprises a PD (Proportional-Derivative) portion.

18. The method of claim 16 wherein the PID controller comprises an integral portion.

19. The method of claim 16 wherein the PID controller comprises a PD (Proportional-Derivative) portion and an integral portion.

20. The method of claim 16 wherein the controller comprises a deep reinforcement learning (DRL) controller, wherein reinforcement learning (RCL) is used to train the weights without a process model.

* * * * *